(12) United States Patent
Aughton et al.

(10) Patent No.: US 7,152,001 B2
(45) Date of Patent: Dec. 19, 2006

(54) FLUID REGULATION

(75) Inventors: David Aughton, Hawthorn East (AU); Iven Mareels, Parkville (AU); Erik Weyer, Parkville (AU)

(73) Assignee: Rubicon Research Pty. Ltd. (AU)

( * ) Notice: Subject to any disclaimer, the term of this patent is extended or adjusted under 35 U.S.C. 154(b) by 0 days.

(21) Appl. No.: 10/469,438

(22) PCT Filed: Mar. 1, 2002

(86) PCT No.: PCT/AU02/00230

§ 371 (c)(1),
(2), (4) Date: Mar. 29, 2004

(87) PCT Pub. No.: WO02/071163

PCT Pub. Date: Sep. 12, 2002

(65) Prior Publication Data

US 2004/0156681 A1    Aug. 12, 2004

(30) Foreign Application Priority Data

Mar. 2, 2001 (AU) ................................. PR3538

(51) Int. Cl.
*G06F 19/00* (2006.01)
(52) U.S. Cl. ........................................................ 702/2
(58) Field of Classification Search .................... 702/2, 702/3, 5; 405/37, 52, 87
See application file for complete search history.

(56) References Cited

U.S. PATENT DOCUMENTS

| 4,022,429 A | 5/1977 | Yonekura |
| 4,332,507 A | 6/1982 | Wakamori |
| 4,498,809 A | 2/1985 | Farmer |
| 4,522,534 A * | 6/1985 | Wakamori et al. ............ 405/37 |
| 4,726,709 A | 2/1988 | Labelle |
| 4,848,962 A | 7/1989 | Whipps |
| 5,516,230 A | 5/1996 | Bargeron |
| 5,613,803 A * | 3/1997 | Parrish ........................ 405/92 |
| 5,708,211 A | 1/1998 | Jepson |
| 5,868,159 A | 2/1999 | Loan |
| 5,984,575 A | 11/1999 | Knott |

FOREIGN PATENT DOCUMENTS

| CH | 188 255 A | 12/1936 |
| DE | 10 80 934 B | 4/1960 |

(Continued)

OTHER PUBLICATIONS

International Search Report, ref: PCT/AU01/01036, Nov. 19, 2001.

(Continued)

*Primary Examiner*—Donald McElheny, Jr.
(74) *Attorney, Agent, or Firm*—Leah Sherry; Dechert LLP

(57) ABSTRACT

The invention discloses a method of predicting the fluid level at a predetermined location in a fluid flow network (10) having at least one regulator (16, 18) to control the flow of fluid along fluid flow network (10). The method includes the steps of collecting data based on timed measurements of fluid levels upstream (24, 28) of at least one regulator (16, 18), fluid levels downstream (26, 29) of at least one regulator (16, 18) and the opening position (30, 32) of at least one regulator (16, 18), and using data analysis (40) to provide a model based on the data whereby the model will provide prediction of fluid level at the predetermined location based on timed measurements of fluid levels upstream (24, 28) of at least one regulator (16, 18) and the opening position (30, 32) of at least one regulator (16, 18).

17 Claims, 1 Drawing Sheet

FOREIGN PATENT DOCUMENTS

| | | |
|---|---|---|
| DE | 11 03 857 B | 3/1961 |
| EP | 345180 A1 | 12/1989 |
| FR | 2594896 A | 8/1987 |
| FR | 2685367 A1 | 6/1993 |
| GB | 2302723 A | 1/1997 |
| JP | 60 088711 A | 5/1985 |
| JP | 08120654 A | 5/1996 |
| JP | 08326040 A | 12/1996 |
| JP | 09221736 A | 8/1997 |
| JP | 10159068 A | 6/1998 |
| JP | 10183585 A | 7/1998 |
| JP | 11241331 A | 9/1999 |
| JP | 11-323885 | 11/1999 |
| JP | 11-323885 A * | 11/1999 |
| NL | 1 010 851 C | 6/2000 |
| SU | 768876 A | 10/1980 |
| SU | 983179 A | 12/1982 |
| SU | 1113462 A | 11/1984 |
| SU | 1283284 A | 1/1987 |
| WO | WO 98/52002 A1 | 11/1998 |
| WO | WO 99/58768 A1 | 11/1999 |
| WO | WO 01/59221 A | 8/2001 |

OTHER PUBLICATIONS

International Search Report, ref: PCT/AU02/00230, Jun. 17, 2002.
Supplemental European Search Report, Ref: 20031075, Jul. 12, 2004.
EPO Search Report, Ref: 2003142, Jan. 10, 2005.

* cited by examiner

FLUID REGULATION

This invention relates to a method of predicting, verifying and determining and/or controlling the fluid level in a fluid network having at least one fluid regulator and relates particularly, though not exclusively, to a method of predicting, verifying and determining and/or controlling the water levels in a canal system having a plurality of fluid regulators.

It is a problem to accurately provide supply of water to the end user without wastage as water is a precious resource. The issue is to exploit the behaviour of (irrigation) canals such as to meet water demand as required by the end-users but within the constraints of the water supply. To this end water is dispatched from reservoirs and transported along the canal to the end user. The operational constraints typically involve water flow limits and prescribed water levels for appropriate delivery of water to the user. (The water levels are in a sense a quality of service measure.) Other constraints on regulators and the rate of change of water levels may also be imposed. These constraints are based on the particular infrastructure and follow from the design and operational experience of the canals. The aim is to deliver water as needed with as little losses as feasible ie. the dispatched water meets demand, but does not over supply. This is critical as in most canal systems unused dispatched water cannot be recovered.

In order to achieve minimum loss operations, ie. to supply water in as much as possible in "on demand" fashion, the canal must operate as if it were a pressurised water network much like city water. Of course, the canals' construction does not allow this mode of operation under any water demand scenario. As the conditions under which this is feasible very much depend on the actual short-term dynamic behaviour of the canals such a mode of operation has never been utilised.

Typical operational conditions of the canals in use around the world depend solely on the long-term dynamic behaviour, something that can be appreciated and learned through experience by a human operator. This mode of operation does not allow one to contemplate water delivery on demand.

Various models have been proposed for irrigation canals and rivers. Most models use the Saint-Venant equations combined with other models derived from first principles that are based on the conservation of mass and/or momentum of water flowing in an open conduit. The Saint-Venant equation based models provide a detailed representation of the water levels along the entire central axis of the channel whereas the model being considered under this invention is one which provides prediction of only those water levels at those points where the water levels are measured and where water levels must be regulated.

In this invention a class of models is proposed from which a particular representative can be selected that can be evaluated inside a computer and through this computational means it will accurately reproduce the dynamical behaviour of a particular pool and regulator combination, both in the short term and long term. The selection of the particular representative from the class of models is based on past observations of water levels and regulator motions over time.

It has been discovered that by introducing water level sensors and controllable regulator gates, it becomes feasible to learn the short-term dynamic behaviour of the canal by collecting water level and gate position measurements and determining their relationship using an algorithm. Learning in this context means the selection of a representative from the given class of models and thus providing a computer the ability to reproduce measurements as if they were taken from the canal or pool. The outcome of this algorithm is a model for the canal's behaviour. The software implementation of this model is such as to predict the future behaviour of the canal.

It is an object of the invention to provide a method to predict the water level in a canal using an algorithm that uses past and present measurements of water level and knowledge of present and future regulator gate positions in a canal system.

A further object of the present invention is to provide a computer process which includes an algorithm called a 'model' that can represent the behaviour of any pool, and by extension the behaviour of any canal.

With these objects in view the present invention in a first aspect provides a method of predicting the fluid level at a predetermined location in a fluid flow network having at least one regulator to control the flow of fluid along said fluid flow network, said method including the steps of collecting data based on timed measurements of fluid levels upstream of said at least one regulator, fluid levels downstream of said at least one regulator and the opening position of said at least one regulator, and using data analysis to provide a model based on said data whereby said model will provide said prediction of fluid level at said predetermined location based on timed measurements of fluid levels upstream of said at least one regulator and the opening position of said at least one regulator.

Preferably said data analysis uses system identification techniques. Preferably said fluid flow network is a canal or river system and said at least one regulator is an overshot gate. In a preferred embodiment a plurality of regulators are provided and each regulator is associated with a module of said model and each module is associated with the upstream fluid level position of its respective regulator, downstream fluid level position of its respective regulator and opening position of its respective regulator. Preferably each module is associated with the regulators that are the upstream and the downstream end of a canal pool. Preferably each module is concatenated to form said model.

In a further aspect of the invention there is provided a system for predicting the fluid level at a predetermined location in a fluid flow network, said system having at least one regulator to control the flow of fluid along said fluid flow network, at least one computation device for collecting data based on timed measurements of fluid levels upstream of said at least one regulator, fluid levels downstream of said at least one regulator and the opening position of said at least one regulator, said at least one computation device adapted to use system identification analysis to provide a model based on said data whereby said model will provide said prediction of fluid level at said predetermined location based on timed measurements of fluid levels upstream of said at least one regulator and the opening position of said at least one regulator.

In yet a further aspect of the invention there is provided a computer based procedure whereby a tuned model for a pool/canal is determined from past measurements of regulator positions and water levels of said pool/canal, said procedure further providing predictions of future water levels based on said past measurements and present and future regulator gate positions, and said procedure determining the optimal present and future regulator positions/movements to exploit the available water resource.

In order that the invention may be more readily understood and put into practical effect, reference will now be made to the accompanying drawings, in which.

To assist in the understanding of the invention a glossary of terms has been provided at the end of this description. Throughout the description and drawings the same reference numerals have been used for similar integers to avoid repetition of description.

Figure 1:
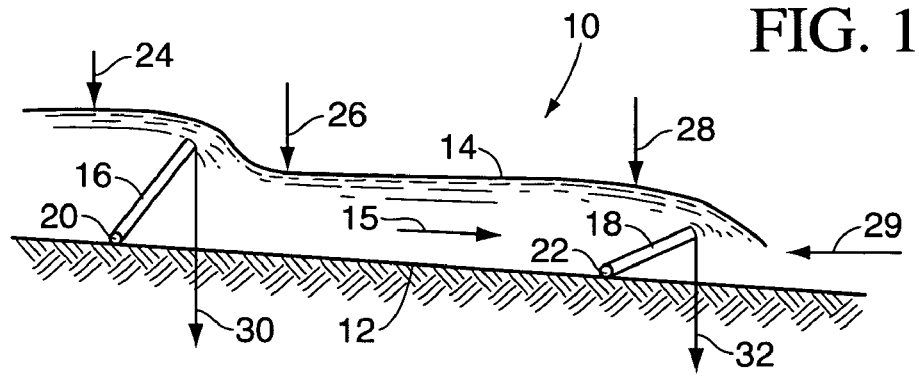
FIG. 1 is a schematic representation of a section along the central axis of a river or canal system which includes flow regulators.

In FIG. 1 there is shown a canal system 10 having a floor 12 along which water 14 can flow in the direction of arrow 15. Along the canal system are a plurality of water regulators 16,18 which control the flow of water along the canal. The water regulators 16,18 are preferably overshot gates of the type shown in our co-pending Australian Patent Application Nos. PQ 9554 and PR 1217 (now International Application No. PCT/AU01/01036), the contents of which are herein incorporated into this specification. Typical overshot gates have a gate which is hinged at the bottom as shown at 20,22. The gates can pivot from a vertical position, where the gate is closed and no water flows, to any angled position towards floor 12, where the flow rate will be determined by the angle of the gate as water flows over the top of the gate. In the preferred embodiment two gates have been shown but the invention is applicable to a single gate or more than two gates. Water level sensors 24,26,28,29 are provided in canal 10 to monitor the height of the water level from an agreed datum point. Sensor 24 is upstream of gate 16 and sensor 26 is downstream of gate 16. Similarly, sensor 28 is upstream of gate 18 and so on. The water level sensors 24,26,28,29 should have a high accuracy with less than 1 cm error in absolute water level measurement Typical sensors can be ultrasonic or pressure based. The ultrasonic type of sensors are based on measuring the time sonar waves take to travel from the sensor, which is positioned above the water surface, and reflected from the surface back to the sensor. Examples of this type of sensor are the "Probe" series made by Milltronics and the "LP" series made by Hawk Measurement Systems. The pressure based sensors measure the water pressure below the surface to derive the distance from the submerged sensor to the water surface. Examples of these sensors are the "PS200" series made by Greenspan and the "PCS" series made by Hawk Measurement Systems. Each gate 16,18 has a sensor (not shown) to determine the height of the top of each respective gate above the agreed datum point as shown at 30,32. Gate position is usually determined by having a sensor attached to the gate drive mechanism (not shown) which relates the rotational position of a shaft within the gate drive mechanism to the actual position of the gate. Rotational position is typically determined using a potentiometric device or encoder that outputs digital signals based on rotational position. The sensors are not limited to the sensors described as they can be substituted by other types depending on the environment. All sensors are preferably coupled to a data logging device, computer or similar device to allow the outputs from the sensors to be collected in real time.

Figure 2:
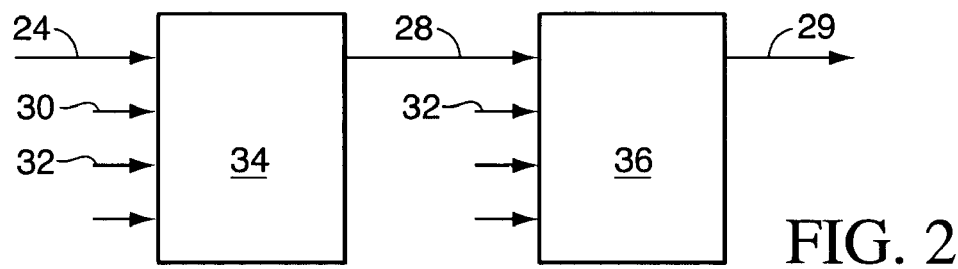
FIG. 2 is a modular representation of modelling a river or canal system shown in FIG. 1.

The data collected from the sensors can be analysed to produce a model for the canal system 10 to allow accurate prediction of water levels along the canal system. The software can be broken into modules with each module typically describing a single reach of the canal system 10 and linking one regulator/gate with a downstream canal reach to another regulator/gate, or level sensor. The concatenation of modules, using the actual topology of the canal then describes the complete canal/river system. This is an important feature that enables application of the model to a wide variety of river/canal systems of various degrees of complexity with many regulators/gates and sensors. This feature greatly assists in the software engineering implementation of the model. The two modules 34,36 for the embodiment shown in FIG. 1 are illustrated in FIG. 2. Each module uses measurable data obtained from water level sensors 24,26,28,29 and gate position sensors of gates 16,18. In this embodiment the model utilises only water level and regulator position data, all along the canal/river system 10. Both in the model construction (the determination of the model) as well as the usage of the model for exploitation of the river/canal it only uses water level sensors and regulator positions. In the event that reliable flow data may be made available, such flow data could also be incorporated in the model.

In order to produce the model data is collected using a sequence of time stamped data from water level and gate position sensors obtained doting a substantial episode of significant variations of water levels and gate positions. The data can be collected in "open loop" situation where the excitation is provided through variations of the gate positions and no other command signals are used to operate the gates 16,18. The variations in the gate positions are an integral step of the procedure, and have to be carefully planned to achieve a meaningful data sequence in a short period of time. Alternatively the data can be collected in a "closed loop" situation where a controller (not shown) actively regulates the water levels towards set points. In this case the data is gathered through a careful variation in the water level set points. These variations are an integral step of the procedure. In a first step the data is manipulated using system identification principles to provide a model which will reproduce downstream water levels, using gate positions and model parameters over a time horizon of collected data. In a second step, water levels are predicted by the model and then compared with the measured data. If the comparison is acceptable, the model parameters are retained and the tuning process is complete. If the comparison identifies unacceptable deviations between prediction and measurement, the model parameters can be changed slightly to reduce this error. The model can then be subjected to the first step of the process to fine tune the model. This same procedure can be used for regular re-calibration of the model, based on measurements collected during normal exploitation of the canal/rivers. The procedures in the second step to change the parameters in order to reduce the deviation between model prediction and data are standard algorithms from mathematical optimisation theory. These are widely reported in the literature, and freely available.

Using the system identification principles, each module 34,36 will describe in a mathematical format its particular section of the river/canal system 10. An example of a derived mathematical format is shown below as Equation 1:

$$\hat{y}_2(t+1) = \theta_1 h_1^{3/2}(t-\tau_1) + \theta_2 h_1^{3/2}(t-\tau_1-1) + \\ \theta_3 h_1^{3/2}(t-\tau_1-2) + \theta_4(\hat{y}_2(t) - p_2(t))^{3/2} + \\ \theta_5(\hat{y}_2(t-1) - p_2(t-1))^{3/2} + \theta_6(\hat{y}_2(t-2) -$$

Equation 1

-continued
$$p_2(t-2))^{3/2} + \hat{y}_2(t) + \theta_7(\hat{y}_2(t) - \hat{y}_2(t-1)) +$$
$$\theta_8(\hat{y}_2(t) - 2\hat{y}_2(t-1) + \hat{y}_2(t-2)) - v(t)$$

The left hand side of the expression is mathematical shorthand for the dynamics based on present and past variables, the right hand side indicates a prediction over a single time step (a computer unit for time). The variables are:

t is the present time in the computer,
$\bar{y}_2(t)$ is the predicted value of the water level downstream of gate 16 and immediately upstream of gate 18,
$y_2(t)$ is the actual water level downstream of gate regulator 16, immediately upstream from gate 18, at time t,
$h_i(t) = y_i(t) - p_i(t)$ is the amount of water above regulator i,
$p_i(t)$ is the position of the regulator i at time t,
$\theta_i$ i=1 . . . 8 are parameters that are tuned as to reflect the actual physical system,
$\tau_i$ this describes the delay time, the time that lapses before a variable becomes relevant, and
v(t) the off take in this reach of river/canal, between gates 16 and 18.

In the above Equation 1, we can identify the following:
($\theta_i$ i=1 . . . 3) the first three terms are related to the inflow of the water into the particular section of canal.
($\theta_i$ i=4 . . . 6) the next three terms are related to the outflow at the end of the section.
the $7^{th}$ term is the integrator term, it represents the storage of water in this section of the river/canal. In this form the term indicates negligible seepage and evaporation.
the next two terms ($\theta_i$ i=7,8) reflect the standing wave phenomena on this section of the river/canal. More similar terms could include multiple wave phenomena, in the present form only one wave phenomenon is accounted for, two extra terms are required for each wave phenomenon that one wants to take into account.
the last term v(t) represents the off takes from this section.

Equation 1 represents a class of models, where, in order to select a single representative of this class the parameters $\theta_i$ must be given appropriate numerical values. This is the object of system identification. The selection of the particular model is completed based on observations of past water levels and regulator motions. In this way the model is tuned or calibrated for a specific pool and regulator combination. A model is said to be tuned if it can faithfully reproduce old measurements and predict future measurements.

The model is readily implemented in computer software. It will enable prediction of the downstream water level from upstream and downstream regulator positions and upstream water level. It describes the dynamics of the section in two aspects:
i. Conservation of water, the water in the section is increased by the supply through the upstream regulator, and decreased by the off takes along the reach, natural phenomena of evaporation and seepage and most importantly by the off take through the downstream regulator.
ii. Standing waves induced by the water motion in the reach.

Each regulator structure is described by an appropriate relationship linking water levels and regulator position to flow. In each module it is considered that head over gate (for overshot gates) is the crucial variable that can be manipulated through varying the gate position and it is considered that down stream water level is the crucial variable to be regulated. This is critical in obtaining a modular structure for the overall model. Moreover this particular choice facilitates the utility of the model for the purpose of regulating water levels in canals. This is an integral feature of our invention. Each module can be tuned using data obtained during operations to represent quantitatively a specific section of the river/canal. Each module has a generic form that can be specialised using measured data from the section of interest during operation of that section. In this way the module will faithfully reproduce old measured data and more importantly predict the future, pre-empting as yet unmeasured data accurately. It is the latter ability of predicting future behaviour that enables the automatic exploitation of the canal/river. The particular choice of variables in the model ie. water levels as regulated variables and head over gate as manipulated variables is unique and relatively easy to implement as opposed to prior art solutions. An implication of this is that controllers should output(calculate) the head over the gate. This applies in particular to Proportional Integral (PI) controllers, ie. the head over the gate is calculated as a weighted sum of the set point error and the integral of the set point error.

The collection of the data and the subsequent analysis allows the model to be constructed. Once constructed, the model can then be used to check the data from which it was constructed. Accordingly, the water levels detected at sensor 28 should be predicted by the model based on the measurements from sensor 24 and the gate position sensors of gates 16,18. When the model can predict its own data correctly, the model can be used in a real time situation to monitor the canal on which it is based. The model will provide an excellent decision support tool for predicting the behaviour of the canal/river systems over extended periods of time and to analyse various exploitation options of the canal/river system. As a short-term prediction tool, the model will enable the automated exploitation of the canal/river system by computerised control from measurement data to remote control commands to the regulators. When the module is used in a SCADA (Supervisory Control and Data Acquisition software environment, users of the canal/river system will be able to understand the dynamic response of the canal/river system to various operational regimes.

Figure 3:
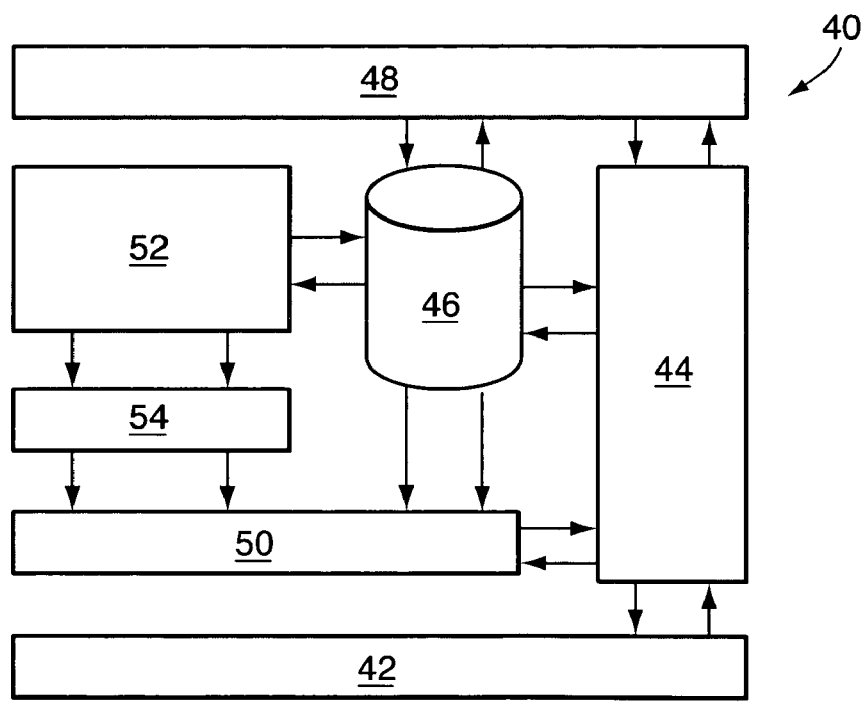
FIG. 3 is a block diagram showing the interface to the system shown in FIGS. 1 and 2.

The interface 40 shown in FIG. 3 integrates the system of FIGS. 1 and 2 with the computer environment for operation. The physical interface 42 includes the sensors 24,26,28,29 and the sensors (not shown) for determining gate position. Physical interface 42 communicates with the SCADA module 44 within a computer (not shown). The SCADA module 44 interacts with the main database 46, the user interface 48 and the linear quadratic (LQ) controller software module 50. The user interface 48 would include such items as utility programs, network editor, etc. User interface 48 also interacts with main database 46. The network topology software module 52 looks after the logical software construction of network objects and communicates with the main database 46 and the pool construction software module 54. Pool construction software module 54 interacts with the LQ controller software module 50 and finally the LQ controller software module 50 interacts with the main database 46.

The models and control software are associated with the main database 46. Information about the location and properties of all sensors and regulators; the particular data describing the dynamical models for all pools using Equation 1; and by concatenation of the same a description of the dynamical behaviour of the whole canal/river system, are held in network topology software module 52. This data is used in the pool construction software module 54 and subsequently in the LQ controller software module 50. Moreover in the same software environment all data required for the wave suppression in measurements and control action are also stored and used in the physical interface 42.

The LQ controller software module 50 uses the measurements of the present and immediate past water levels and the model as well as the preferred future water levels, to compute the new gate positions over a short horizon of time into the future such as to minimise over this horizon the gate movements and water resource losses whilst achieving the maximally attainable degree of accuracy of the desired future water levels over this horizon. The LQ controller 50 performs this function across one or more reaches of the canal to achieve optimal operation of the canal. To this end a computation device able to interface with the SCADA system and through it with the model for the pool/canal/river, performs a dynamic programming task which leads to a desired control action. This control action takes into account the present water level situation and corrects for any deviation between the actual and desired at the present. This is feedback action. Moreover the control action takes into account the future behaviour of the canal as predicted through the model and the future desired water levels as specified by the authority that is responsible for the pool/canal/river exploitation. This is feed forward action, as it acts in the present on the basis of the given future demand requirements and a prediction of the future behaviour.

The computations are repeated at regular intervals, every time making use of the latest available measurements concerning the water levels and gate positions, water requirements and desired future water levels.

It is a distinct feature of this invention that the model and control objectives can be formulated in specific circumstances in such a manner that the dynamic programming task can be performed inside the computer without relying on real data The results of this computation can then be stored and used with real data to compute and implement the necessary control action.

In general, the model and control implementation will require the use of real data and will be performed in real time. In view of the typical dynamics of pools/canals this can be readily achieved with present computational means.

As control objectives are modified, or the model changes or in case of loss of regulator structures through failure, the dynamic programming task may be repeated with this new set of conditions as to re-compute what the best control actions are under the modified operational conditions. It is a feature of this invention that such modifications are readily implemented and computed even for an entire canal/river system. This feature is a direct consequence of the modularity of the model and the particular choice of variables head over gate and water levels.

In the physical interface 42 the signals are modified to suppress the impact of waves and to ensure that the control actions are smooth such as not to excite any waves through control. In this way waves in a pool, canal/river are due to external effects (like disturbances) outside the control capability of the regulating structures. This suppressing of waves is called filtering. For measurement data this filtering is completed in two stages. The first stage is at the sensor itself, before an actual measurement is recorded and transmitted to the SCADA system 44. This filtering removes potential artefacts due to the sampling process itself. The next level of filtering is performed in software on the digitised measurements. To this end use is made of the pool model data in the SCADA system 44 to ensure that the standing waves, which depend on the geometry of the particular pool/canal/river are adequately removed, and only these water level changes are recorded that are associated with the change of volume of water in the associated pool. (Standing waves have the effect of changing the water level, but the associated volume change is negligible.) For gate position changes the filtering may either be achieved through means of formulating the control objective in such a way as to prohibit the gate position changes to induce standing wave motions in the pools. Alternatively, filtering may be achieved directly by smoothing the gate position changes as required by the control algorithm in such as to ensure that no waves will be induced in the canal.

Whereas each of the separate concepts of modelling, calibration, filtering and dynamic programming are well known to people versed in the art of control, the invention is unique through its combination of all these aspects in a single framework that is specifically adjusted for the task of controlling and exploiting canals/rivers. A further unique feature of the invention is its choice of variables, water levels and head over gate as the base variables for modelling and control, this leads to a natural modular structure enabling large scale implementation. A farther unique feature is the compact class of models particularly adjusted to deal with water level control through regulator movements. A further unique feature of the invention is its ability to deal with a single pool/regulator environment as well as with a plurality of pools and regulators. All the while achieving the optimal exploitation of the pool/canal/river.

The invention has many advantages over existing methodologies. Firstly, it has the ability of the model to be quantitatively reliable, leading to improved exploitation of the overall infrastructure and water resource. Secondly, the ability of the model to encompass in whole or in part a canal/river system. It uses scalable technology which is easy to retrofit and more easily deployed than present solutions. Most solutions deployed to date have a singular objective, either modelling or controlling, which tend to consider a single water level/single regulator structure in isolation. Thirdly, the ability of the model to be tuned from data gathered during the normal operation of the river/canal using set point variations in water levels and regulators. In contrast to the prior art models the invention is based on data, and reproduces the actual physical behaviour of a particular canal/river system. The invention has the capability of being used to exploit the canal/river system so as to attain optimal operational objectives. It must also be noted that past as well as future regulator gate positions are available at present because the regulator gate positions can be selected and implemented through control actions.

The invention can also be used to:
1. Detect in the short term incorrect water level measurements.
2. Detect and correct erroneous data from water level sensors and adjust the data in a data base.
3. Verify the consistency of data in data bases containing past measurements of water levels and regulator positions.
4. Unsatisfactory performance.
5. Detect unscheduled extraction of fluid from the network.

This preferred embodiment proposes a method to model the dynamic response including the short term behaviour of the channels (regulators to channel behaviour) from timed measurements of regulator movements and water level changes obtained either whilst the channel is under normal operation, or when a specific operation regime is used to assist the modelling of the channel. Moreover the preferred embodiment proposes an associated approach to control the behaviour of the channels based on these models.

The preferred embodiment uses the model to process the water level measurements obtained from the water level sensors such as to suppress any wave phenomena, i.e. represent the slow (average) water level behaviour. This is feature enables the controller to achieve its objectives whilst avoiding all unnecessary and undesirable gate movements. In-particular through the suppression of wave phenomena in the data, the control action will be sufficiently smooth such as not to cause any waves through regulator movements. The controller uses the past water level measurements and the desired future water levels to adjust the gate position such as to achieve desired water levels in a pool and by extension a complete canal. The software allows the model of a pool/canal to be optimised/tuned using measurements obtained during the normal operation of the pool/canal. This is called model tuning and controller calibration. It is a feature which allows for the automatic calibration of the controller and model and this greatly simplifies the set-up and commissioning of the model and controller in a canal system.

In an alternative embodiment form, the invention relates to the controlling of flow or a combination of flow and fluid levels in a fluid network through the use of a plurality of fluid regulators. To fix the ideas the example of fluid level is discussed throughout, but anyone trained in the art of control can readily adopt the present discussion to apply it to the situation of flow control or a mixture of fluid levels and fluid flows.

Although the preferred embodiment has been described with reference to overshot gates it is readily applicable to any type of regulator including undershot gates.

The invention will be understood to embrace many further modifications as will be readily apparent to persons killed in the art and which will be deemed to reside within the broad scope and ambit of the invention, there having been set forth herein only the broad nature of the invention and certain specific embodiments by way of example.

GLOSSARY

'Closed Loop Identification' shall be interpreted as the process of performing System Identification experiments upon the system with certain of the system forcing signals (the system inputs) being determined (at least in part) by certain of the responses of the system (the system outputs). Closed loop identification thus operates under a feedback mechanism, whereby the system outputs are driven to one or more set points, allowing the System Identification task to be performed during normal operating conditions and without disturbing the normal operation of the system.

'Control Algorithm' refers to a calculated and arranged method of determining values of signals or information which we can manipulate in the system in order to modify a system variable, causing the system variable to approach a desired characteristic or value.

'Controlling Element' and 'Controller' shall refer to a physical device which implements the Control Algorithm. The controller is itself a system. The Controller modifies one or more inputs of the system under control in order to make one or more of the system outputs take on desired properties or values. The controller comprises sensors to observe certain signals, system inputs and outputs; it requires information about set points which are the desired values of certain system signals; a computer to perform calculations on the sensor responses, and a means of exciting the system so as to force the system signals to the desired set points. The computer performs calculations on the sensor inputs so as to determine an output, which will make the system signals approach their desired set point values. In the context of the behaviour of the system, the controller is in itself a system chosen such as to eliminate from the controlled system's behaviour, that which is undesirable. E.g. In an irrigation canal a regulator will maintain specified water levels within an acceptable range through the use of observations about past water levels and regulator actions.

'Discrete Time' refers to a means of representing continuous time with a finite number of samples.

'Disturbances' an exogenous variable, normally beyond direct user influence, but that can be observed through its effect on the behaviour of the system. e.g. measurement errors, rain influencing the water level in a canal, and evaporation due to solar radiation, wind etc. . .

'Dynamic Programming' is a method in mathematical systems theory that refers to control design through an optimisation task. A given objective function, encapsulating the desired behaviour of the system, is optimised over a given horizon. Dynamic programming is particularly well suited for sampled data control environments.

'Excite' shall be interpreted as changing a system input signal in order to generate an observable response in the system.

'Fluid Network' is defined as any fluid transport medium, natural or man-made e.g. an irrigation channel, river, lake, subterranean aquifer, pressurised or unpressurised pipeline conveying fluids.

'Global' shall be interpreted as referring to the total fluid system of interest—comprising the fluid sources, flow paths, fluid storages, control structures, and fluid delivery points.

'Head' refers to the pressure head of the fluid. In free surface conditions, the head is equivalent to the fluid surface level. With reference to a piped or enclosed fluid transfer medium in which there is no free fluid surface (defined as a fluid surface which is not constrained by a wall or other impermeable or unporous surface), head shall refer to the pressure at a point within the fluid network. (It corresponds to the what the free surface condition would have been at that point in the network.)

'Head Over Gate' refers to the depth of fluid above the crest of an overshot gate. Referring to FIG. 1, the head over gate is defined as the difference between the gate top edge and the direct upstream water level, these being measured with respect to the same datum level.

'Identification Algorithm' a particular automated technique of system identification.

'Local' refers to the part of the fluid network that is directly controlled by a regulator and is bounded by the adjacent regulators.

'LQ Controllers' LQ or Linear Quadratic Controllers are controllers which minimise the quadratic objective function, such as the weighted sum of the square of the water level fluctuations upstream of each gate. i.e. they can address one or more control objectives with a relative weighting applied to each. A LQ controller can have one or more input variables and one or more output variables. In the context of the use of LQ control for this invention, the quadratic nature of the objective function may be replaced with another positive criterion.

'Model' is defined as a mathematical expression amenable to computing that approximates the behaviour of a system. Models are themselves systems which are created inside a computer.

'Model Parameter'—a constant value which is a characteristic of a model, it is essential in defining the model's behaviour.

'Open Loop Identification' shall be interpreted as the process of performing System Identification experiments upon the system without any of the system forcing signals (the system inputs) being determined (wholly or in part) by certain of the responses of the system (the system outputs).

'PI Controller' PI or Proportional Integral controllers calculate the manipulated variable as a weighted sum of the deviation from set point and the integral of the deviation from set point 'Optimal' shall be interpreted as the best as measured against a particular user defined criterion; e.g. the best model may be a model that has the smallest prediction error over a given time horizon of prediction.

'Real time' the time as measured in the physical world, as distinct from simulation time, a representation of time inside a computer, e.g. as used in simulation of a model to capture inside a computer the behaviour of a system.

'Real Time Data' is a reference to data that is obtained from the system with a small interval between the time of the measurement of the data and the time of recording or availability for use of the data. In the context of this patent, the time interval is of a short duration, relative to the response times of the system, to allow rapid control actions to occur to meet the control objectives.

'Regulator' shall be interpreted as a physical device that is able to alter the head or flow of a fluid within the fluid network. A regulator typically constrains the passage of the fluid in one or more dimensions. In one dimension, the fluid has a 'free surface' with no constraint. In two dimensions there is no free surface at the regulator, rather the operating dimensions of the regulator determine the effects on the fluid flow. For example, in two dimensions valve or slide gate/sluice gate. In one dimension—overshot gate, weir gate.

'Response' shall be interpreted as a change in any measurable or observable physical phenomenon.

'Saint-Venant equations'—The flow of water and the propagation of waves in waterways are described by the conservation of mass and the conservation of momentum equations. The mass conservation equation:

$$\frac{\partial A}{\partial t} + \frac{\partial Q}{\partial x} = q, \tag{E11}$$

where A is the cross-sectional area, t is time, Q is flow, x is distance down the canal, and q is the inflow per unit length. The momentum equation written in terms of area and discharge is:

$$\frac{\partial Q}{\partial t} + \left(\frac{gA}{B} - \beta\frac{Q^2}{A^2}\right)\frac{\partial A}{\partial x} + 2\beta\frac{Q}{A}\frac{\partial Q}{\partial x} = gA(\bar{S} - S_f) + qu_q - \frac{Q^2}{A}\frac{d\beta}{dx}, \tag{E2}$$

where g is gravitational acceleration, $S_f$ is the friction slope, $\bar{S}$ is the mean bed slope at a section, and the inflow has a velocity of $u_q$ before mixing. The coefficient $\beta$ is the Boussinesq momentum coefficient which is the correction which must be applied such that the integral of the square of the velocity over the section can be approximated in terms of discharge and area: Equations (E11) and (E2) form a pair of partial differential equations which express the evolution with time of disturbances in waterways. They are at the core of much hydraulic modelling, especially where rapid transients are required to be computed, and several commercial programs are available.

'Sampled data' refers to the circumstance in which measurements are available at discrete instances of time as opposed to continuously available. Accordingly the control actions are also limited to take place at set points in time. Such environments are known as 'Sampled data control systems'.

'Set point'—a particular target value within the allowable range of a given signal. The set point is input to a controller, whose task it is to maintain the value or property of the given signal within a defined deviation from the set point.

'Signal' any timed sequence of data, e.g. a timed measurement sequence obtained from the system, usually via instrumentation.

'Simulation' is defined as the use of the system model to reproduce the behaviour of the system in whole or in part, e.g. predict the response of the system outputs given measurements, or characteristics of the system inputs.

'Step' shall refer to the process of moving a signal between two defined set points as fast as possible.

'System' shall be interpreted as the physical environment that is being modelled and/or controlled. For this patent application it refers to a fluid network and related regulators. In broad terms a system is defined via the observable signals, in the case of rivers/canals: regulator positions and water levels.

'System behaviour', or 'behaviour', is the collection of all possible timed measurements (signals) that can be obtained from a system. It represents what is possible in the system from on observer's point of view. A model is supposed to reproduce the behaviour as closely as possible, i.e. representing all of the possibilities without eliminating or adding to what can be measured in reality. The quality of a model reflects how well it can perform this task.

'System Identification' is the technique of deriving a system model from experimental data. It consists of suggesting a suitable computer representation for the model of the system of interest, followed by a tuning process in which the particular representation is optimised as to reproduce as closely as possible experimental timed observations obtained from the system. The methodology provides a means of comparing different models and ranking them according to their ability of reproducing the system's behaviour. System identification is a particular subtopic in mathematical system theory and also in statistics.

'System Input' a variable/signal that can effect changes in the system response. One makes a distinction between these inputs that are under control of the user, e.g. regulator position and those system inputs that are not under control of the user, e.g. rainfall, evaporation. Note that system inputs are signals.

'System Output' refers to signals, normally distinct from the system inputs, and that are affected by the system inputs.

'System state' variables that are essential in describing the system's behaviour. System states may be measured or not. e.g. a water level is a locally measured signal, but not available along the complete length of a network; water flow is a system state, but is not always measured.

The invention claimed is:

1. A method of predicting the fluid level at a predetermined location in a fluid flow network having at least one regulator to control the flow of fluid along said fluid flow network, said method including the steps of collecting data based on timed measurements of fluid levels upstream of said at least one regulator, fluid levels downstream of said at least one regulator and the opening position of said at least one regulator, and using data analysis based on system identification techniques to provide a model based on said data whereby said model will provide said prediction of fluid level at said predetermined location based on time measurements of fluid levels upstream of said at least one regulator and the opening position of said at least one regulator.

2. The method of claim 1, wherein said fluid flow network is a canal or river system and said at least one regulator is an overshot gate.

3. The method of claim 1, wherein a plurality of regulators are provided and each regulator is associated with a module or said model and each module is associated with the upstream fluid level position of its respective regulator, downstream fluid level position of its respective regulator and opening position of its respective regulator.

4. The method of claim 3, wherein each module is associated with the regulators that are the upstream and the downstream end of a canal pool.

5. The method of claim 3, wherein each module is concatenated to form said model.

6. The method of claim 2, wherein said fluid levels are the heights of water levels from an agreed datum point.

7. The method of claim 6, wherein said model uses head over gate (as hereinbefore defined) determinations in said data analysis based on the opening positions of said at least one regulator and said fluid levels downstream of said at least one regulator.

8. A system for predicting the fluid level at a predetermined location in a fluid flow network, said system having at least one regulator to control the flow of fluid along said fluid flow network, at least one computation device for collectivecollecting data based on time measurements of fluid levels upstream of said at leasleast one regulator, fluid levels downstream of said at least one regulator and the opening position of said at least one regulator, said at least one computation device adapted to useusing data analysis based on system identification analysistechniques to provide a model based on said data whereby said model will provide said predication of fluid level at said predetermined location based on timed measurements of fluid levels upstream of said at least one regulator and the opening position of said at least one regulator.

9. A computer based procedure whereby a tuned model for a pool/canal is determined from past measurements of regulator positions and water levels of said pool/canal based on system identification techniques, said procedure further providing predictions of future water levels based on said past measurements and present and future regulator gate positions, and said procedure determining the optimal present and future regulator positions/movements to exploit the available water resource.

10. The method of claim 1, wherein said fluid flow network is a canal or river system and said at least one regulator is an overshot gate.

11. The method of claim 10, wherein a plurality of regulators are provided and each regulator is associated with a module or said model and each module is associated with the upstream fluid level position of its respective regulator, downstream fluid level position of its respective regulator and opening position of its respective regulator.

12. The method of claim 1, wherein a plurality of regulators are provided and each regulator is associated with a module or said model and each module is associated with the upstream fluid level position of its respective regulator, downstream fluid level position of its respective regulator and opening position of its respective regulator.

13. The method of claim 2, wherein a plurality of regulators are provided and each regulator is associated with a module or said model and each module is associated with the upstream fluid level position of its respective regulator, downstream fluid level position of its respective regulator and opening position of its respective regulator.

14. The method of claim 4, wherein each module is concatenated to form said model.

15. The method of claim 2, wherein said model uses head over gate (as hereinbefore defined) determinations in said data analysis based on the opening positions of said at least one regulator and said fluid levels downstream of said at least one regulator.

16. The method of claim 1, wherein said fluid flow network is a canal or river system having a first regulator and a second regulator downstream of said first regulator associated with a module of said model, said module being derived in a computer based procedure with a formula as follows:

$$\hat{y}_2(t+1) = \theta_1 h_1^{3/2}(t-\tau_1) + \theta_2 h_1^{3/2}(t-\tau_1-1) + \theta_3 h_1^{3/2}(t-\tau_1-2) + \\ \theta_4(\hat{y}_2(t) - p_2(t))^{3/2} + \theta_5(\hat{y}_2(t-1) - p_2(t-1))^{3/2} + \\ \theta_6(\hat{y}_2(t-2) - p_2(t-2))^{3/2} + \hat{y}_2(t) + \\ \theta_7(\hat{y}_2(t) - \hat{y}_2(t-1)) + \theta_8(\hat{y}_2(t) - \\ 2\hat{y}_2(t-1) + \hat{y}_2(t-2)) - v(t)$$

where:
  t is the present time in the computer,
  $\hat{y}_2(t)$ is the predicted value of the water level downstream of said first regulator and immediately upstream of said second regulator,
  $y_2(t)$ is the actual water level downstream of said first regulator, immediately upstream from said second regulator, at time t,
  $h_i(t)=y_i(t)-p_i(t)$ is the amount of water above the regulator i (where i=1 for first regulator and i=2 for second regulator),
  $p_i(t)$ is the position of regulator i at time t,
  $\theta_i$, i=1 . . . 8 are parameters that are tuned as to reflect the actual physical system,
  $T_i$ is the delay time, the time that lapses before a variable becomes relevant, and
  v(t) is the off take in this reach of river/canal, between said first and second regulators.

17. The computer based procedure of claim 9, wherein said pool/canal has a first regulator and a second regulator downstream of said first regulator associated with a module of said model, said module being derived in a computer based procedure with a formula as follows:

$$\hat{y}_2(t+1) = \theta_1 h_1^{3/2}(t-\tau_1) + \theta_2 h_1^{3/2}(t-\tau_1-1) + \theta_3 h_1^{3/2}(t-\tau_1-2) + \\ \theta_4(\hat{y}_2(t) - p_2(t))^{3/2} + \theta_5(\hat{y}_2(t-1) - p_2(t-1))^{3/2} + \\ \theta_6(\hat{y}_2(t-2) - p_2(t-2))^{3/2} + \hat{y}_2(t) + \\ \theta_7(\hat{y}_2(t) - \hat{y}_2(t-1)) + \theta_8(\hat{y}_2(t) - \\ 2\hat{y}_2(t-1) + \hat{y}_2(t-2)) - v(t)$$

where:
- t is the present time in the computer,
- $\hat{y}_2(t)$ is the predicted value of the water level downstream of said first regulator and immediately upstream of said second regulator,
- $y_2(t)$ is the actual water level downstream of said first regulator, immediately upstream from said second regulator, at time t,
- $h_i(t)=y_i(t)-p_i(t)$ is the amount of water above the regulator i (where i=1 for first regulator and i=2 for second regulator),
- $p_i(t)$ is the position of regulator i at time t,
- $\theta_i$, i=1 . . . 8 are parameters that are tuned as to reflect the actual physical system,
- $T_i$ is the delay time, the time that lapses before a variable becomes relevant, and
- v(t) is the offtake in this reach of river/canal, between said first and second regulators.

* * * * *

UNITED STATES PATENT AND TRADEMARK OFFICE
CERTIFICATE OF CORRECTION

PATENT NO.         : 7,152,001 B2
APPLICATION NO.    : 10/469438
DATED              : December 19, 2006
INVENTOR(S)        : David Aughton, Iven Mareels and Erik Weyer It is certified that error appears in the above-identified patent and that said Letters Patent is hereby corrected as shown below:

At Col. 13, line 34 "collectivecollecting" is corrected to read -- collecting --

At Col. 13, line 35 "leasleast" is corrected to read -- least --

At Col. 13, line 38 "useusing" is corrected to read -- using --

At Col. 13, line 39 "analysistechniques" is corrected to read-- analysis techniques--

Signed and Sealed this

Twenty-third Day of October, 2007

JON W. DUDAS
*Director of the United States Patent and Trademark Office*